Figure 1:
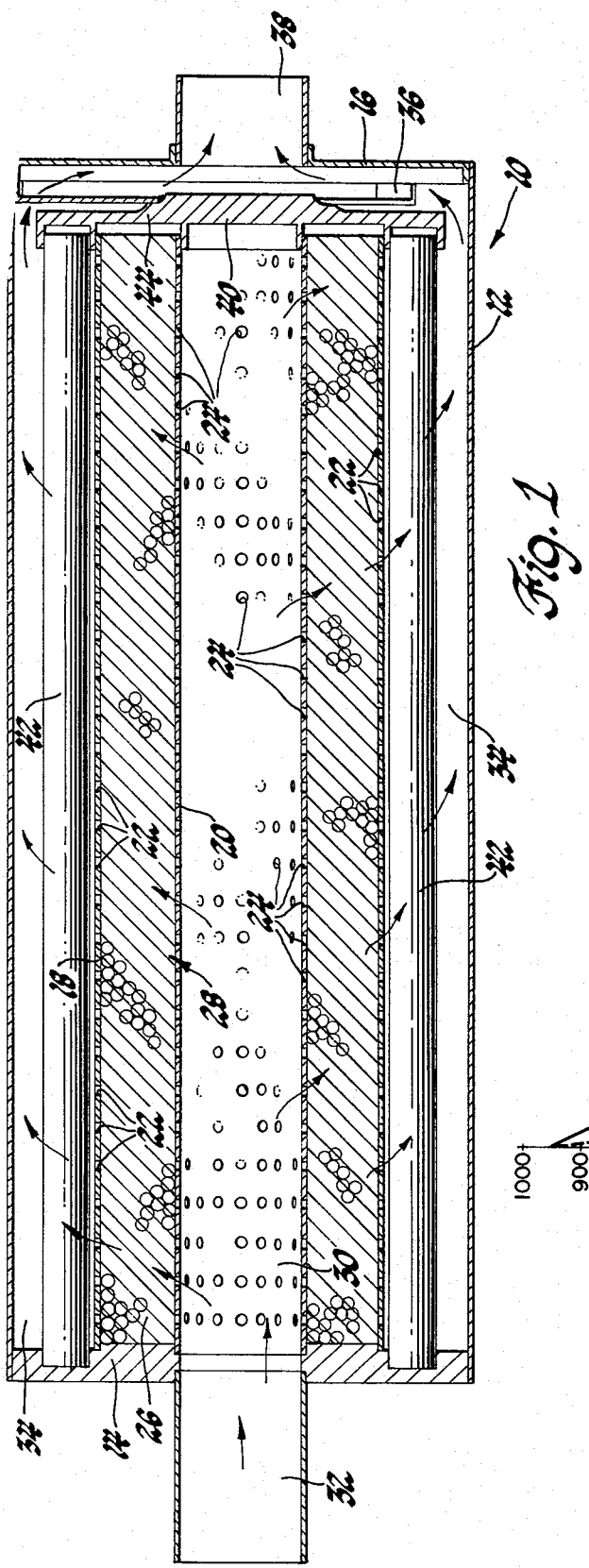

United States Patent [19]
Hunter, Jr.

[11] 3,874,854
[45] Apr. 1, 1975

[54] CATALYTIC CONVERTER

[75] Inventor: Joseph E. Hunter, Jr., Rochester, Mich.

[73] Assignee: General Motors Corporation, Detroit, Mich.

[22] Filed: Feb. 1, 1973

[21] Appl. No.: 328,682

[52] U.S. Cl. ............... 23/288 F, 23/288 K, 60/298, 60/300, 252/70
[51] Int. Cl. .......................... F01N 3/14, B01J 9/04
[58] Field of Search ........... 23/288 F, 288 K, 288 L; 60/300, 298; 165/104, 104 M; 252/70

[56] References Cited
UNITED STATES PATENTS

| | | | |
|---|---|---|---|
| 1,430,222 | 9/1922 | Evans | 165/104 |
| 1,971,660 | 8/1934 | Sander | 252/70 |
| 2,078,948 | 5/1937 | Houdry | 23/288 K |
| 2,158,854 | 5/1939 | Drake | 252/70 |
| 2,898,202 | 8/1959 | Houdry et al. | 23/288 F |
| 2,946,651 | 7/1960 | Houdry | 23/288 F UX |
| 3,180,083 | 4/1965 | Heller | 60/300 X |
| 3,189,417 | 6/1965 | Houdry et al. | 23/288 F |
| 3,289,743 | 12/1966 | Biro | 165/104 X |
| 3,473,323 | 10/1969 | Bnggs et al. | 23/288 F X |
| 3,754,398 | 8/1973 | Mattavi | 60/298 |

FOREIGN PATENTS OR APPLICATIONS

| | | | |
|---|---|---|---|
| 102,388 | 1/1917 | United Kingdom | 165/104 |
| 1,014,498 | 12/1965 | United Kingdom | 23/288 F |

Primary Examiner—Barry S. Richman
Attorney, Agent, or Firm—Sidney Carter

[57] ABSTRACT

A catalytic converter having contained and disposed in the outlet plenum thereof a fusible material operative to absorb a portion of the sensible heat of the treated exhaust gases passing out of the converter during periods of converter operation and to release a portion of the absorbed heat to the catalytic element during periods of non-operation to maintain the temperature of the catalytic element above its minimum activation temperature for prolonged periods of non-operation. In the preferred embodiment, the fusible material consists of a zinc chloride-sodium chloride eutectic.

3 Claims, 2 Drawing Figures

CATALYTIC CONVERTER

This invention relates to the catalytic treatment of exhaust gases from an internal combustion engine and, more particularly, to a catalytic converter wherein the catalytic element is maintained at an elevated temperature for prolonged periods of time following cessation of converter operation.

In automotive applications, a catalytic converter having a catalytic element positioned therein is placed in the engine exhaust stream such that exhaust gases from the engine pass into the converter and through the catalytic element which contains a catalytic material effective to oxidize CO and unburned hydrocarbons to $CO_2$ and water and/or reduce oxides of nitrogen to oxygen and nitrogen before being released to the atmosphere.

Although the nature of catalysts and of catalytically induced reactions is not fully understood, it is known that in order for the catalyst to first become effective it must be heated to a temperature above a minimum activation temperature. This temperature varies with catalyst composition; however, as a general principle, for noble metal catalyst, i.e., catalysts containing such noble metals as platinum and palladium, virtually 100% activity is achieved at a temperature in the range of about 350° to 450° F; and for non-noble metal catalysts, i.e., catalysts formed of transition metal oxides, a gradual increase in activity is observed from temperatures as low as about 250° F with the catalyst reaching 50 – 90% activity in the range of about 350° to 450° F for CO and 400° to 550° F for unburned hydrocarbons, and 100% activity for both constituents in the range of 600° to 750° F. The catalyst material within the converter must therefore absorb an initial amount of heat from the sensible heat of the exhaust gases passing therethrough before reaching activation temperature at which point the catalytic reaction becomes self-sustaining. As a result, during this "warm-up" period the exhaust gases pass through the converter essentially untreated. Accordingly, it may be seen that if the catalyst were maintained at or above activation temperature for prolonged times between periods of engine operation, e.g., 6 to 12 hours, then the warm-up period would be minimized for vehicles in daily use and emissions therefrom accordingly lessened.

It is also known that the oxidation and reduction reactions occurring in the presence of the catalyst are exothermic reactions, and it has been found that the liberated heats of reaction contribute in part to increasing the temperature of the catalyst itself but in large part to increasing the sensible heat of the treated gases exiting the catalytic converter. As a result, during normal operation of the converter, the temperature of the exiting gases is on the order of 200° to 250° F higher than the average temperature of the catalytic element.

Accordingly, it is the principal object of this invention to provide a catalytic converter having contained and disposed therein a fusible material operative to absorb a portion of the sensible heat of the treated exhaust gases during periods of converter operation and to release the absorbed heat to the catalytic element during periods of non-operation thereby serving to maintain the temperature of the catalyst above its activation temperature for prolonged periods of non-operation.

It is a further object of this invention to provide a catalytic converter having contained and disposed therein a fusible material which melts at a temperature above the activation temperature of the catalyst and has a high latent heat of fusion, whereby a large source of stored heat is available at this temperature for maintaining the catalyst above its activation temperature for prolonged periods of time.

These and other objects are accomplished in accordance with the preferred embodiment of my invention by providing a catalytic converter having an exhaust gas inlet and exhaust gas outlet communicating interiorly of the converter with an inlet plenum and an outlet plenum, respectively, separated by a catalytic exhaust gas treatment element, and a fusible material contained and disposed in the outlet plenum operative to absorb at least a portion of the sensible heat of the treated exhaust gases flowing therethrough during periods of converter operation and to release at least a portion of the absorbed heat to the catalytic element during periods of non-operation. The contained fusible material has a melting point in the range of 400° to 900° F and a latent heat of fusion of at least about 10,000 BTU/ft$^3$.

Figure 2:
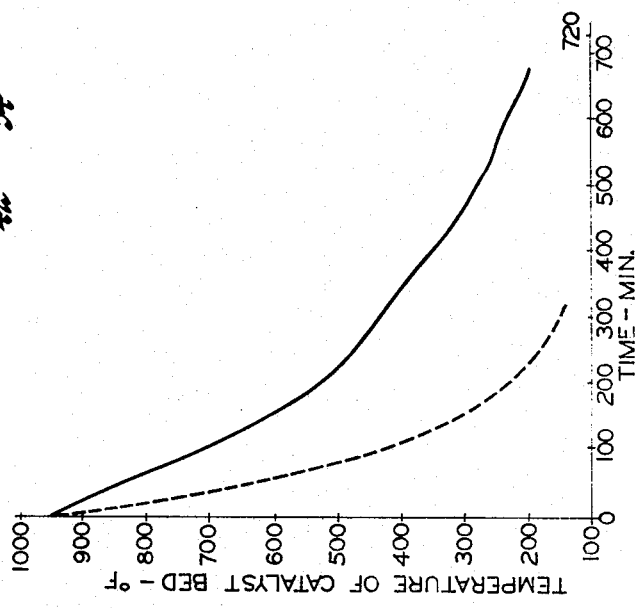

Other objects and advantages will be apparent from the following detailed description reference being had to the accompanying drawings of which:

FIG. 1 is a cross-sectional illustration of a catalytic converter embodying the invention, and FIG. 2 is a graph comparing the decrease in catalytic element temperature with time for the catalytic converter shown in FIG. 1 with a catalytic converter not embodying the heat storage means of this invention.

It will be recognized by those skilled in the art that the invention disclosed and described in detail is not limited to any particular converter design and, accordingly, a generalized type of catalytic converter 10 to which the invention is applicable is shown in FIG. 1 as including an annular outer housing 12 having sealed end plates 14 and 16 and having mounted therein an annular outer catalyst retaining plate 18 and an annular inner catalyst retaining plate 20. The catalyst retaining plates 18 and 20 include a plurality of perforations or louvers 22 and 24, respectively, extending therethrough and are adapted to contain a quantity of catalytic material 26 disposed therebetween thereby defining a catalytic element 28.

The catalyst 26 can be in any form, e.g., in a pelleted, extruded or spherical form with or without a support or carrier. Typically, the catalyst is distributed or impregnated in a support or carrier which may or may not contribute to the catalytic activity of the composite. However, it is to be recognized that my invention is not limited to the use of any particular catalyst but includes the use of any suitable oxidation or reduction catalyst or catalyst capable of both oxidation and reduction which is effective at elevated operating temperatures, e.g., up to about 1600° F over extended periods of time.

The inner catalyst retaining plate 20 further defines an exhaust gas inlet plenum 30 in communication with an exhaust gas inlet 32 extending at one end through the housing end plate 14 and, at its respective opposite end, attached to the engine exhaust pipe (not shown). The outer catalyst retaining plate defines in combination with the housing 12 an exhaust gas outlet plenum 34 communicating through openings 36 with an exhaust gas outlet 38 extending at one end through housing end plate 16, and at its respective opposite end attached to the exhaust pipe leading to the tail pipe (not shown) such that the catalytic converter 10 is placed instream with the exhaust gases passing from the engine to the atmosphere.

The inlet plenum 30 is sealed at one end 40 opposite the inlet 32 such that exhaust gases passing into the converter through the inlet 32 pass into the inlet plenum 30 and then radially outwardly through the perforations or louvers 24 in the inner catalyst retaining plate 20 to the catalyst material 26 wherein the oxidation and/or reduction reactions take place. The treated gases then pass through the perforations or louvers 22 in the outer retaining plate 18 and into the outlet plenum 34 to be exhausted through the exhaust gas outlet 38.

In accordance with the principal feature of this invention, within the outlet plenum 34 are mounted a plurality of sealed tubes 42 so disposed, spaced apart with respect to each other and to the catalytic element, that the treated exhaust gases passing from the catalytic element 28 are caused to flow over and around the tubes. Within the tubes 42 is contained a fusible material, hereinafter fully described, operative to absorb at least a portion of the sensible heat of the treated gases passing from the catalytic element 28 to the outlet 38 during converter operation and to release at least a portion of the absorbed heat to the catalytic element 28 during periods of non-operation thereby serving to decrease the rate of heat loss from the element 28 during such periods of non-operation. The element 28 and the tubes 42 are rigidly mounted at one end in the housing end plate 14 and slidably mounted at the other in a support plate 44 so as to allow for thermal expansion and contraction of the elements during operation.

As described above, the function of the fusible material contained in the tubes 42 is to maintain the temperature of the catalytic element above its activation temperature for prolonged periods of non-operation. The fusible material should therefore have a melting point just above this activation temperature and have a high latent heat of fusion. However, in some catalyst systems, particularly those wherein catalyst activity increases gradually with temperature such as when any of the group of transition metal oxide catalyst are employed, it may be desired that the catalyst be held at a higher temperature of, e.g., the temperature corresponding to 50% or 90% catalyst activity. Accordingly, in accordance with the operating characteristics of catalytic converters known to the art, the fusible material should melt in the range of about 400° to 900° F. In either case, however, the material should have a heat storage capacity greater than 10,000 BTU/ft$^3$, preferably greater than 20,000 BTU/ft$^3$, based on latent heat of fusion per room temperature density. Further, the material should have a boiling point or decomposition temperature greater than the maximum operating temperature of the converter system to avoid a pressure build-up in the tubes 42. In addition, it is desirable that the material be containable with common materials, such as stainless steel, and be relatively inexpensive. There are numerous materials available in the art meeting these criteria, including a large number of eutectic mixtures of salts, and an exemplary listing of such materials is set forth below in Table I.

TABLE I

| Material | Heat of Fusion BTU/ft$^3$ | M.P. °F | B.P. °F |
|---|---|---|---|
| Lithium Hydroxide | 29,542 | 864° | d.1697° |
| Zinc Chloride, Sodium Chloride Eutectic | 21,125 | 518° | > 1350° |
| Zinc | 19,575 | 787° | 1663° |
| Silver Chloride | 13,754 | 851° | 2822° |
| Zinc Chloride | 13,192 | 541° | 1697° |
| Bismuth | 13,102 | 520° | 2691° |
| Cadmium | 12,642 | 610° | 1409° |
| Sodium Hydroxide | 11,967 | 612° | 2516° |

A preferred material is a zinc chloride-sodium chloride eutectic consisting of 58 mole % ZnCl and 42 mole % NaCl. However, a useful composition for this mixture would be over the range of 0–42 mole % NaCl.

During converter operation, heat is stored as specific heat in the converter structure and as specific heat and latent heat of fusion in the heat storage material contained in tubes 42. Accordingly, during periods of non-operation there becomes available an amount of heat for decreasing the rate of temperature decline of the catalytic element proportional to the sum of the specific heat of the liquid phase, the specific heat of the solid phase, and the latent heat of fusion of the material.

To demonstrate the effectiveness of my invention a catalytic converter of design shown in FIG. 1 was constructed. The converter was 7½ inches in diameter and 21 inches long, excluding the inlet and outlet pipes, and was wrapped with one inch of fiberfax insulation. Disposed in the outlet plenum were 23 tubes three-fourths inch in diameter and 18 inches long formed of type 304 stainless steel. The tubes contained a total of 10 pounds of a 76.3 wt.% ZnCl — 23.7 wt.% NaCl eutectic mixture which melts at 518° F and has a latent heat of fusion of 21,125 BTU/ft$^3$. The converter contained 9 pounds of catalyst.

The converter was furnace heated to 1000° F and then allowed to air cool while the temperature of the catalyst bed was continuously monitored. FIG. 2 shows the rate of temperature decline of the catalyst with time (solid line).

For purposes of comparison a similar converter not including the heat storage material was similarly furnace heated to 1000° F and air cooled. Its rate of temperature decline with time is shown in dotted lines in FIG. 2.

Referring to FIG. 2, it may be seen that the converter embodying my invention cooled to 500° F in about 230 minutes and to 200° F in slightly less than 12 hours. In comparison, the similarly insulated converter cooled to 500° F in about 80 minutes and to 200° F in about 230 minutes.

Although my invention has been described in terms of a specific embodiment, it will be recognized by those skilled in the art that other forms may be adopted within the scope of the invention.

What is claimed is:

1. In a catalytic converter for the treatment of automotive exhaust gases, a housing having an exhaust gas inlet communicating with an inlet plenum interiorly of said housing, an exhaust gas outlet communicating with an outlet plenum interiorly of said housing, and a catalytic element disposed between said inlet and said outlet plenums such that said exhaust gases passing from said inlet to said outlet are caused to pass through said catalytic element and be treated therein; the improvement consisting of, a plurality of sealed containers supported only in said outlet plenum in spaced apart relationship with respect to each other and said catalytic element to enable treated exhaust gases to flow over and around said containers, a fusible material in said containers, said material having a melting point in the range of about 400° to 900° F. and a latent heat of fusion of at least about 10,000 BTU per cubic foot, said material being operative to absorb at least a portion of the sensible heat of the treated gases passing from said catalytic element to said outlet during converter operation and to release at least a portion of the absorbed heat to said catalytic element during periods of non-operation thereby serving to decrease the rate of heat loss from said element during said periods of non-operation, and being used in sufficient quantity to maintain the catalyst at operating temperature during desired periods of non-operation.

2. The catalytic converter of claim 1 wherein said fusible material has a latent heat of fusion of at least 20,000 BTU per cubic foot.

3. The catalytic converter of claim 1 wherein said fusible material is zinc chloride with sodium chloride being present in an amount of from 0 to about 42 mole %.

* * * * *